Jan. 3, 1961 R. D. KELL 2,967,210

DELAY-COMPENSATED INDEXING SYSTEM

Filed June 30, 1955 2 Sheets-Sheet 1

INVENTOR.
RAY D. KELL
BY
[signature]
ATTORNEY

Jan. 3, 1961 R. D. KELL 2,967,210

DELAY-COMPENSATED INDEXING SYSTEM

Filed June 30, 1955 2 Sheets-Sheet 2

INVENTOR.
RAY D. KELL
BY [signature]
ATTORNEY

United States Patent Office 2,967,210
Patented Jan. 3, 1961

2,967,210

DELAY-COMPENSATED INDEXING SYSTEM

Ray D. Kell, Princeton, N.J., assignor to Radio Corporation of America, a corporation of Delaware Filed June 30, 1955, Ser. No. 519,156

10 Claims. (Cl. 178—5.4)

The present invention relates to new and improved television image reproducing apparatus of the type employing a cathode ray tube of the so-called "line screen" variety.

Among the forms of color television reproducing apparatus proposed thus far is one which includes a cathode ray kinescope having a target screen made up of a plurality of groups of strip-like elements adapted to emit light of respectively different colors in response to electron beam impingement. In the case of such a tube, means are provided for causing a plurality of electron beam components to scan a raster pattern on the screen, the raster comprising a plurality of horizontal line scans separated from each other vertically. Means are provided additionally to insure that the video signal representative of the respectively different component colors of the image being televised are employed in controlling the intensity of the beam component intended to illuminate a given color producing element. Such means may employ, for example, special elements (e.g., strips of ultraviolet light-emitting material) associated with the target screen for sensing the position of the beam components and for providing indication thereof in the form of index signals so that the operation of the image reproducing apparatus may be controlled through the agency of means responsive to the index signals.

In the case of a color kinescope of the above type wherein the color light-producing elements or strips are vertically oriented, so that the lines of the scanning raster are generally perpendicular thereto, the scanning electron beam is sequentially modulated in intensity with video signals respectively representative of the different colors to be reproduced as the beam is deflected across the strip-like elements. Thus, the intervals of beam modulation with a particular color-representative signal must correspond to intervals during which the beam impinges upon a particular color light-producing element. Thus it has been proposed that the screen of such a tube include index signal producing elements positioned to generate index signals indicative of the position of the electron beam with respect to the light-producing elements.

It has been found that, in line screen tubes including index signal generating elements for control purposes, the index signals derived from a given line scan are quite similar to the corresponding signals produced during another line scan.

It is, therefore, a primary object of the present invention to provide new and improved color image reproducing apparatus.

Another object of the invention is that of providing, in a color television arrangement involving an electron beam adapted to impinge sequentially upon respectively different areas of a target screen, an improved feedback arrangement for insuring that the beam is properly modulated in intensity by color representative video signals as it impinges upon the areas of the screen.

As will be appreciated by those skilled in the art, feedback arrangements and, particularly, those which are commercially feasible, include inherent delay-causing circuit components so that information which may be derived from the screen of the kinescope is unavoidably delayed in the feedback path. By virtue of the fact, as stated above, that the tracking history of the scanning beam in a tube of the type in question does not vary appreciably from line to line, the beam controlling feedback arrangement may be substantially improved as to its operation and the effect of its inherent delay overcome in accordance with the present invention by rendering the beam intensity controlling action responsive to information derived from a line scanning interval preceding the line being scanned at any given time.

Thus, briefly, the present invention comprises, in accordance with a specific embodiment described herein by way of illustration, means for deriving from the target screen of a line screen color kinescope index signals representative of the position of an electron beam with respect to the screen, means for continuously delaying such index signals by the duration of one line scanning interval minus the inherent delay in the feedback path and means for controlling the sequential beam intensity modulation with video signals in response to the delayed index signals.

Additional objects and advantages of the present invention will become apparent to those skilled in the art from a study of the following detailed description of the accompanying drawing in which.

Figure 1:
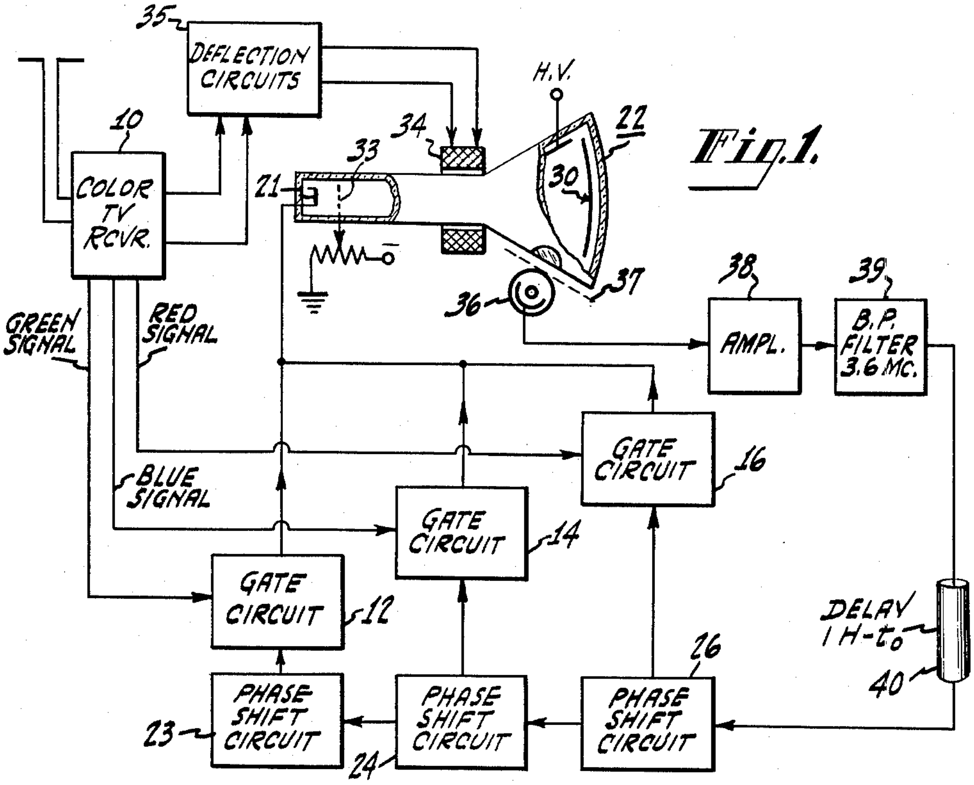
Fig. 1 illustrates, by way of a block diagram, a color television receiver in accordance with one form of the invention.

Referring to Fig. 1, there is shown a color television receiver 10 which is utilized for receiving a composite television signal and forming therefrom respectively different component color-representative video signals such, for example, as a green signal, a blue signal, and a red signal. A television receiver for deriving such color signals from a received color television signal is shown and described in "Practical Color Television for the Service Industry," second edition, revised edition, April 1954, published by the RCA Service Co. Inc., a Radio Corporation of America Subsidiary. The color signals green, blue and red are applied respectively to gate circuits 12, 14 and 16. The control or gating of the gate circuits 12, 14 and 16 is effected by gating signals derived in phase shifting circuits 23, 24 and 26 in a manner to be described.

The gated color signals from the gate circuits 12, 14 and 16 are combined and applied to the cathode 21 of an image reproducing kinescope 22. The image reproducing kinescope 22 includes a target screen 30 shown more fully in the enlarged, fragmentary view of Fig. 2. The target screen 30 comprises a transparent foundation plate (e.g., the glass face plate of a kinescope) having strip-like color light-producing elements R, B, and G positioned thereon and oriented vertically. As described in U.S. Patent No. 2,310,863, granted to Leverenz, the color light producing phosphor elements of the screen may comprise the following materials: chromium-activated aluminum berylliate or zinc cadmium sulfide activated by silver for the red elements R, silver-activated zinc sulfide and zirconium silicate for the blue elements B and alphawillemite activated with manganese or zinc cadmium sulfide activated with silver for the green elements G. The color light-producing strip-like elements may be positioned in the order shown in Fig. 2. Associated with the color producing elements are index signal generating elements in the form of ultra-violet light-emitting phosphor strips 32. For example, an electron-transparent light-reflecting layer (not shown) of aluminum may be positioned behind the color light-producing elements R, B and G and the ultra-violet light-emitting phosphor strips 32 may be positioned behind the aluminum coating between the groups of phosphors R, B and G. While not shown, guard spaces may be provided between the elements R, B and G and the ultra-violet strips may be located in appropriate ones of the guard spaces.

An electron gun in the kinescope including the cathode 21 and a control electrode 33 produces and directs an electron beam (not shown) toward the screen 30. The beam is caused to scan a raster pattern on the screen under the control of an electro-magnetic deflection yoke 34 which is energized by suitable line and field frequency deflection currents from circuits 35 which are operated in synchronism with the transmitter by means of synchronizing signals contained in the received composite television signal.

It will thus be understood, that as the electron beam in the kinescope 22 scans horizontally across the target screen 30, the beam will sequentially impinge upon red, blue, green and ultraviolet light-emitting strip-like elements. It will further be understood that it is desired to control the gate circuits 12, 14 and 16 through the application of gating signals in such manner that the electron beam in the kinescope is sequentially modulated with red-, blue-, and green-representative video signals. The intervals during which the electron beam is modulated with these different signals must coincide with the intervals during which the electron beam impinges upon the different strip-like color light-producing elements on the image screen within the reproducing tube 22. During the time when the electron beam impinges upon one of the index signal-generating elements 32, an ultra-violet light index signal will be emitted. The ultra-violet light index signals are sensed by a light-responsive photo-electric cell 36 through a light filter 37 positioned in a window of the tube 22.

Figure 2:
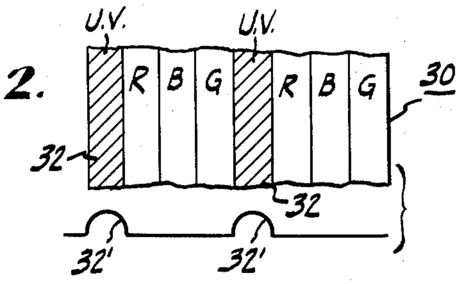
Fig. 2 is an enlarged, fragmentary view of the screen of the kinescope of Fig. 1.

The index signals sensed by the photoelectric cell 36 are amplified by a stage 38 and are filtered by a bandpass filter 39 to provide a sinusoidal gating wave for application to the phase shifting circuits 26, 24 and 23. The pulses 32' in Fig. 2 illustrate the fact that, each time the electron beam in the kinescope scans across an ultra-violet light-emitting strip 32, an index signal pulse 32' is produced. Thus, the control signal derived from the bandpass filter 39 will be understood as being a signal whose frequency is indicative of the number of signal generating elements 32 scanned by the electron beam during a particular period. The number of strips may be so chosen with respect to the normal line scanning rate of 15.75 kcs. approximately as to produce index signals 32' having a fundamental frequency of 3.6 mcs. The signal from the bandpass filter may therefore be utilized to generate gating waves for switching the application of the different color representative video signals to the cathode 21 of the kinescope 22. A similar switching arrangement is shown and described in U.S. Patent No. 2,545,325, issued to P. K. Weimer, March 13, 1951.

The 3.6 mcs. wave from the output of the filter 39 is applied via apparatus 40 (to be described more fully hereinafter) to the input of the first phase shifting circuit 26. Each of the phase shifting circuits 26, 24 and 23 introduces a 120° phase shift into the wave from the filter 39. The phase shifted signals, when applied to the gate circuits 16, 14 and 12 will, therefore, sequentially pass the red, blue and green representative video signals to the cathode 21 of the kinescope. As these video signals are sequentially applied to the cathode 21, the electron beam in the kinescope is intensity modulated according to the intensity of the gated video signals. Circuits suitable for performing the gating functions and phase shifting functions are shown and described in the above-cited Weimer patent.

Figure 3:
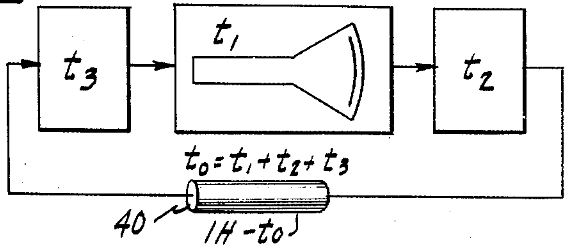
Fig. 3 is a diagrammatic representation to be described.

As stated briefly earlier, it has been found that the various elements in the feedback path which may be traced from the kinescope, through the amplifying, filtering, gating circuits and through the kinescope include inherent delay. In fact, such delay may cause the utilization of information from the photocell to be late by two or three groups of color light-emitting phosphor elements. Where, moreover, the scanning velocity is not uniform, the time delay in the use of the sampling information or gating signal results in the production of incorrect color on the screen of the kinescope. To overocme the foregoing described difficulty, the present invention provides a delay apparatus indicated by the section of delay line 40, which apparatus introduces a time delay in the index signal between the phototube and the utilization circuits which is equal to the period of one scanning line interval minus the other time delays in the feedback path. The inherent delays in the circuit may be lumped together and designated as $t_0$. The delay in the kinescope itself may be designated as $t_1$, while the delay preceding the delay line 40 is designated $t_2$ and the delay in the gating circuits is designated as $t_3$. Thus, as shown in Fig. 3, which illustrates the feedback path of the apparatus of Fig. 1, the delay line 40 is actually equal to 1H (i.e., the period of a single scanning line interval) minus $t_0$, where $t_0$ is the sum of $t_1$, $t_2$ and $t_3$.

It will be recognized from the foregoing that the total delay through the feedback loop is, by virtue of the inclusion of the delay apparatus 40 having a time delay of $1H-t_0$, equal to exactly one horizontal scanning line interval. Thus, the timing of the gating of the video signals onto the cathode of the kinescope during any given line interval is based upon information derived from the index signals produced during the preceding line interval. Stated otherwise, the color information as reproduced on the screen 30 of the kinescope is displaced vertically by one scanning line. Since, using conventional deflection circuitry, the sides of the scanning raster may be made to be substantially vertical, the position of an ultra-violet light-generating index strip 32 which produces a particular index pulse is directly above that elemental area of the screen being scanned by the beam at any given time. By reason of the foregoing, the accuracy of the video signal application to the electron beam in the kinescope is rendered independent of scanning velocity irregularities over a practical range.

While any suitable apparatus of known variety may be employed for producing the $1H-t_0$ delay of the apparatus 40, one suitable form is a quartz rod of proper dimensions having a quartz crystal transducer on each end to form an ultrasonic delay line. If desired, the delay line may be built into the filter 39 which may have a pass band of ± mcs. centered about the sampling frequency of 3.6 mcs. Other forms of delay apparatus, such as mercury delay line, for example, may be employed alternatively. While, in the specific example illustrated, the video signal sampling frequency has been chosen as 3.6 mcs., it will be understood that other frequencies, such, for example, as 5 mcs. may be employed instead.

Figure 4:
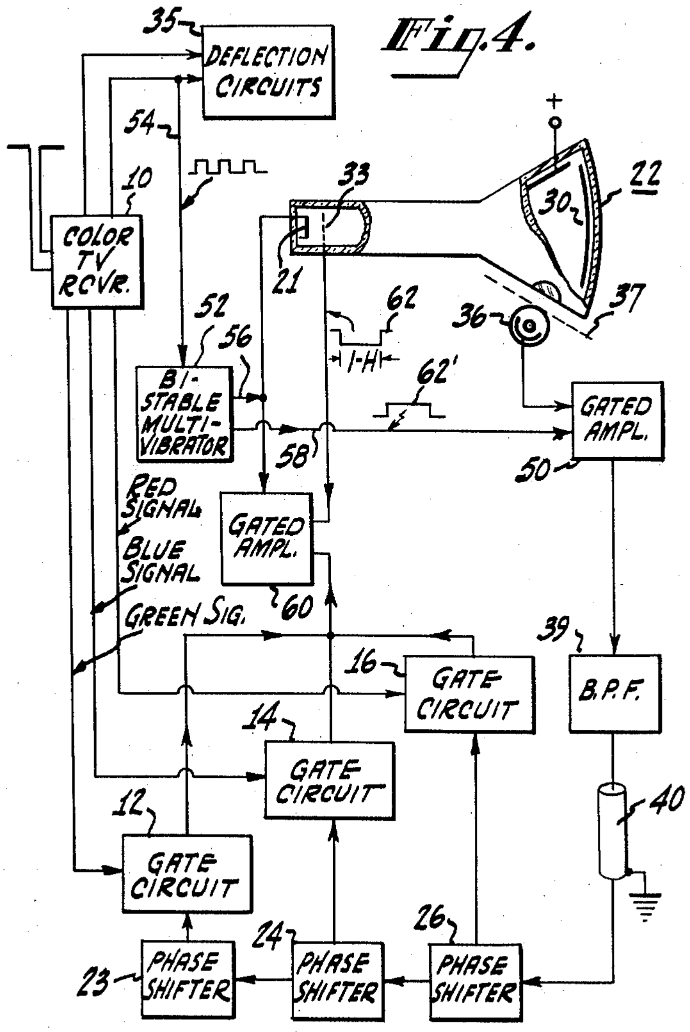
Fig. 4 illustrates by way of a block diagram another form of the invention.

In accordance with the form of the invention shown in Fig. 1, the electron beam in the kinescope is, during any given line scanning interval, sequentially modulated with color representative video signals in accordance with the gating signals derived from the photocell index signals. Each scanning line, however, is productive of color image information on the screen of the kinescope. In the form of the invention shown in Fig. 4, color image reproduction is accomplished only during alternate lines of the raster, the intervening line interval being used solely for the purpose of deriving index signals to be employed in the succeeding lines. In Fig. 4, elements of the arrangement corresponding to portions of the apparatus of Fig. 1 are designated by the same reference numerals. Briefly, the color television receiver 10 produces red, blue and green video signals for application to gate circuits 16, 14 and 12, respectively, which are controlled by the waves from phase shifters 26, 24 and 23. The phase of sampling of the video signals for application thereof sequentially to the cathode 21 of the kinescope 22, is, as in the case of Fig. 1, under the control of index signals sensed by a photocell device 36 through a filter 37. The index signals are applied through an amplifier 50 and bandpass filter 39 to a delay apparatus 40 having a delay equal to $1H-t_0$ as explained in connection with Fig. 3.

In addition to the apparatus of Fig. 4 corresponding to components of Fig. 1, means are provided for producing only index signals during alternate lines of the raster and for producing color image information on the screen of the kinescope during the intervening lines under the control of the index signals derived during the preceding lines. A bi-stable multivibrator 52 receives via a lead 54 the horizontal synchronizing pulses derived in the receiver 10 from the composite received television signal. The multivibrator 52 provides at its output leads 56 and 58 opposite polarities of a rectangular wave which is of half the line frequency. That is to say, each positive-going cycle of the rectangular wave has a period equal to one horizontal scanning line period and each negative-going half cycle of the wave has the same duration. Signals from the lead 56 are applied simultaneously to the control electrode 33 of the kinescope and to a gated amplifier 60 which serves as a signal coupling circuit between the gate circuits 12, 14 and 16 and the cathode 21 of the kinescope.

Figure 5:
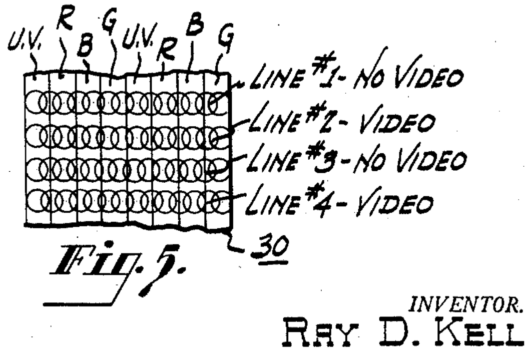
Fig. 5 is an enlarged, fragmentary view of the screen of the kinescope of Fig. 4 showing certain line scanning relationships.

When the negative-going half cycle of the controlling wave 62 from the multivibrator 52 is applied to the kinescope control grid and to the gated amplifier 60, the following actions take place: The gated amplifier is prevented from conducting during the period of the negative half cycle of the wave 62 and the beam current in the kinescope 22 is reduced to a level sufficient to produce ultra-violet light control signals but insufficient to produce visible light from the screen of the kinescope. While the negative-going half cycle of the multivibrator control wave is thus applied to the kinescope and to the gated amplifier, no video signal modulation of the electron beam in the kinescope occurs. During this interval, however, the positive-going half cycle of the wave 62' from the multivibrator 52 is applied to the gated amplifier 50 to cause that amplifier to pass index signals from the photocell 36 through the feedback path. Thus, the index signals produced during television line interval No. 1 which, as shown in Fig. 5, includes no video modulation of the beam, are passed through the delay apparatus 40 and applied to the phase shifter circuits 26, 24 and 23. During television line interval No. 2, however, the reverse polarities of the waves 62 and 62' are applied to the respective receiving points, so that the gated amplifier 50 is prevented from passing index signals during that line interval but video signals are passed by the gated amplifier 60 to the cathode of the kinescope 22 for the sequential modulation of the electron beam intensity with color-representative video signals. Thus, line No. 2 of the scanning raster is productive of color image light. During line interval No. 3, the same conditions existing during line No. 1 obtain, so that no video modulation of the electron beam occurs, but index signals are produced and passed to the delay apparatus 40 for use during television line interval No. 4 in the production of another line of the color image. By way of summary, therefore, it will be understood that, during lines 1, 3, 5, 7, etc., only index signals are being produced (i.e., with no color image light) and, during lines 2, 4, 6, 8, etc., the color image is being produced on the basis of the index signals produced during lines 1, 3, 5, 7, respectively.

An arrangement of the type shown in Fig. 4, employing the delay apparatus 40 whose delay is equal to 1H minus the delay inherent in the circuits affords the advantages described in connection with the arrangement of Fig. 1. Another feature of the arrangement of Fig. 4 is that the possibility of interference between picture information and index signals is effectively precluded.

Circuitry suitable for performing the function of the bistable multivibrator 52 may be found, for example, in "Waveforms," page 164, Fig. 5–4, volume 19 of the M.I.T. Series, McGraw-Hill Book Company, N.Y.

Figure 6:
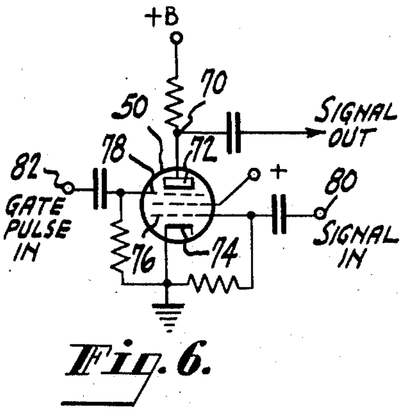
Fig. 6 is a schematic diagram of a gated amplifier circuit to be described.

Fig. 6 illustrates circuitry suitable for performing the functions of the gated amplifiers 50 and 60 in Fig. 4. By way of example, the gated amplifier 50 may comprise a multi-electrode vacuum tube having an anode load terminal 70 connected to its anode 72, a cathode 74 and conduction controlling electrodes 76 and 78. The index signal to be passed by the amplifier during alternate line intervals is applied to the terminal 80 for application to the first control grid electrode and the gating pulse 62' from the multivibrator 52 is applied to a terminal 82 for application to the third control grid electrode. When the wave applied to the electrode 78 is positive-going, the tube 50 is conductive to pass the signal applied to the terminal 80 to its output terminal 70. Conversely, when the wave applied to the terminal 82 is a negative wave, the amplifier 50 is prevented from conduction.

Having thus described my invention, what I claim as new and desire to secure by Letters Patent is:

1. Color television image reproducing apparatus which comprises: a cathode ray tube kinescope having a target screen made up of a plurality of parallel strip-like elements of respectively different color light emitting characteristics and means for producing and directing an electron beam toward said screen; deflection means associated with said kinescope for causing said beam to scan a raster on said screen, said raster comprising a plurality of line scansions across said strip-like elements; means associated with said kinescope for modulating the intensity of said electron beam sequentially with video signals representative of the colors of an image being reproduced; means operatively associated with said kinescope for deriving index signals therefrom bearing information indicative of the position of said beam with respect to said screen; means for applying said index signals to said modulating means for controlling said modulating means; and means electrically connected directly between said index signal-deriving means and said modulating means for delaying the passage of said index signals from said signal deriving means to said controlling means by a period of approximately one line scanning interval.

2. Color television image reproducing apparatus which comprises: a cathode ray tube kinescope having a target screen made up of plurality of parallel strip-like elements of respectively different color light emitting characteristics and means for producing and directing an electron beam toward said screen; deflection means associated with said kinescope for causing said beam to scan a raster on said screen, said raster comprising a plurality of line scansions across said strip-like elements; means associated with said kinescope for modulating the intensity of said electron beam sequentially with video signals representative of the colors of an image being reproduced; means operatively associated with said kinescope for deriving index signals therefrom bearing information indicative of the position of said beam with respect to said screen; means for applying said index signals to said modulating means for controlling said modulating means, said index signal-deriving means, said signal-applying means and said modulating means having inherent time delays; and means electrically connected directly between said index signal-deriving means and said modulating means for delaying the passage of said index signals from said signal deriving means to said controlling means by a period of approximately one line scanning interval less the sum of said inherent time delays.

3. Color television image reproducing apparatus which comprises: a cathode ray tube kinescope having a target screen made up of a plurality of parallel strip-like elements of respectively different color light emitting characteristics and means for producing and directing an electron beam toward said screen; deflection means associated with said kinescope for causing said beam to scan a raster on said screen, said raster comprising a plurality of line scansions across said strip-like elements; means associated with said kinescope for modulating the intensity of said electron beam sequentially with video signals representative of the colors of an image being reproduced; means operatively associated with said kinescope for deriving index signals therefrom bearing information indicative of the position of said beam with respect to said screen; means for applying said index signals to said modulating means for controlling said modulating means; and an electrical delay line connected directly between said source of signals and said last-named means for delaying said index signals by an amount such that the opertion of said modulating means at any point in a given line scansion is based upon information from said index signals regarding the corresponding point in a preceding line scansion.

4. Color television image reproducing apparatus which comprises: a cathode ray tube kinescope having a target screen made up of a plurality of parallel strip-like elements of respectively different color light emitting characteristics and means for producing and directing an electron beam toward said screen; deflection means associated with said kinescope for causing said beam to scan a raster on said screen, said raster comprising a plurality of line scansions across said strip-like elements; modulating means associated with said kinescope for modulating the intensity of said electron beam sequentially with video signals representative of the colors of an image being reproduced; means operatively associated with said kinescope for deriving index signals therefrom bearing information indicative of the position of said beam with respect to said screen; means for applying said index signals to said modulating means for controlling said modulating means; and means electrically connected between said index signal-deriving means and said modulating means for delaying the passage of signals from said signal deriving means to said controlling means by a period of approximately one line scanning interval; and means operative during regularly spaced line scansions for preventing the modulation of said beam with video signals by said modulating means and for permitting the derivation of such index signals by said signal-deriving means.

5. Color television image reproducing apparatus which comprises: a cathode ray tube kinescope having a target screen made up of a plurality of parallel strip-like elements of respectively different color light emitting characteristics and index-signal generating elements associated therewith for generating index signals in response to electron impingement and means for producing and directing an electron beam toward said screen; deflection means associated with said kinescope for causing said beam to scan a raster on said screen, said raster comprising a plurality of line scansions across said strip-like elements; modulating means associated with said kinescope for modulating the intensity of said electron beam sequentially with video signals representative of the colors of an image being reproduced; means operatively associated with said kinescope for deriving index signals therefrom bearing information indicative of the position of said beam with respect to said screen; means for applying said index signals to said modulating means for controlling said modulating means; and means electrically connected directly between said index signal-deriving means and said modulating means for delaying the passage of said index signals from said signal deriving means to said controlling means by a period of approximately one line scanning interval.

6. Color television image reproduction apparatus which comprises: a cathode ray tube kinescope having a target screen made up of a plurality of groups of vertically oriented strip-like elements of respectively different color light emitting characteristics and means for producing and directing an electron beam toward said screen; deflection means associated with said kinescope for causing said beam to scan a raster pattern on said screen, said raster comprising a plurality of horizontal line scansions separated vertically from each other; modulating means coupled to said kinescope for modulating the intensity of said electron beam sequentially with viedo signals respectively representative of said different color characteristics; means operatively associated with said kinescope for deriving index signals therefrom indicative of the position of said beam with respect to said screen; means for producing a plurality of differently phased control waves from said index signals; means coupled between said last-named means and said modulating means for applying said control waves to said modulating means; said kinescope index signal-deriving means, control wave-producing means and wave-applying means forming a feedback loop having an inherent time delay; and delay means interposed electrically directly between said index signal-deriving means and said wave-producing means, said delay means having a time delay approximately equal to the time required for said beam to make one line scansion minus said inherent time delay.

7. Color television image reproduction apparatus which comprises: a cathode ray tube kinescope having a target screen made up of a plurality of groups of vertically oriented strip-like elements of respectively different color light emitting characteristics and ultraviolet light generating index elements associated with said strip-like elements for producing ultra-violet light signals in response to electron impingement and means for producing and directing an electron beam toward said screen; deflection means associated with said kinescope for causing said beam to scan a raster pattern on said screen, said raster comprising a plurality of horizontal line scansions separated vertically from each other; modulating means coupled to said kinescope for modulating the intensity of said electron beam sequentially with video signals respectively representative of said different color characteristics; light responsive means operatively associated with said kinescope for deriving index signals therefrom indicative of the position of said beam with respect to said screen; means for producing a plurality of differently phased control waves from said index signals; means coupled between said last-named means and said modulating means for applying said control waves to said modulating means; and delay means interposed electrically directly between said index signal-deriving means and said wave-producing means, said delay means having a time delay approximately equal to the time required for said beam to make one line scansion.

8. A television system which comprises: image-reproducing apparatus having a screen made up of a plurality of repeating groups of color light-emitting elemental areas and means for scanning said areas in a succession of fields each including a plurality of vertically spaced lines to energize said areas sequentially, said scanning being effected at a relatively fast time rate and at a relatively slow field rate; a source of color-representative signals corresponding to said color light-emitting areas; means associated with said image-reproducing apparatus for deriving index signals from the scansion of said screen in a line scanning direction; modulating means coupled operatively between said color signal source and said index signal-deriving means and adapted to apply color-representative signals to said image-reproducing apparatus sequentially in such manner as to modulate the intensity of such screen area energization under the control of such index signals; delay means for delaying the application of index signals to said modulating means for substantially the period of one scanning line interval; means operating in synchronism with said line scanning of said elemental areas for causing selected lines of a field to be devoted, at least in part, solely to the production of index signals, said means comprising a gate controlled by pulses occurring at the repitition rate of said scanning line intervals for periodically interrupting the application of video signals to said image-reproducing apparatus, such that said selected lines constitute screen search lines while the remaining lines of said field constitute display lines active in the production of image light.

9. A television system which comprises: image-reproducing apparatus having a screen made up of a plurality of repeating groups of color light-emitting elemental areas and means for scanning said areas in a succession of fields each including a plurality of vertically spaced lines to energize said areas sequentially, said scanning means comprising line and field scanning control circuits; a source of color-representative signals corresponding to said color light-emitting areas; means associated with said image-reproducing apparatus for deriving index signals from the scansion of said screen in a line scanning direction; modulating means coupled operatively between said color signal source and said index signal deriving means and controlled by such index signals for applying color-representative signals to said image-reproducing apparatus sequentially in such manner as to modulate the intensity of such screen area energization; delay means for delaying the application of index signals to said modulating means for substantially the period of one scanning line interval; means operating in synchronism with said line scanning control circuit for causing alternate lines of a field to be devoted, at least in part, solely to the production of index signals, said means comprising a gate controlled by pulses occurring at the repetition rate of said scanning line intervals for periodically interrupting the application color-representative video signals to said image-reproducing apparatus, such that said selected lines constitute screen search lines while the remaining lines of said field constitute display lines active in the production of image light.

10. Color television image reproducing apparatus comprising a cathode ray tube kinescope having a beam deflected line-by-line over a target screen made up of a plurality of parallel strip-like elements of respectively different color light emitting characteristics and indexing signal producing elements distributed throughout said screen for indicating the position of said beam, modulating means associated with said kinescope for modulating the intensity of said electron beam sequentially with video signals representative of the colors of an image being reproduced, means for deriving an electrical indexing signal in response to impingement of said beam on said indexing signal producing elements, and delay means directly coupling said electrical indexing signal to said modulating means, said delay means being constructed to continuously delay the continuously available indexing signal by an amount equal to approximately one line scanning interval, whereby the modulation of said beam is continuously controlled in accordance with indexing information obtained from the corresponding points in the preceding scan line.

References Cited in the file of this patent

UNITED STATES PATENTS

| | | |
|---|---|---|
| 2,644,855 | Bradley | July 7, 1953 |
| 2,648,722 | Bradley | Aug. 11, 1953 |
| 2,685,047 | Moore | July 27, 1954 |
| 2,689,269 | Bradley | Sept. 14, 1954 |
| 2,713,605 | Bradley | July 19, 1955 |
| 2,725,421 | Valdes | Nov. 29, 1955 |
| 2,831,052 | Boothroyd | Apr. 15, 1958 |